March 12, 1957  A. G. HOLTZ  2,784,442
CASTER UNIT
Filed May 27, 1954
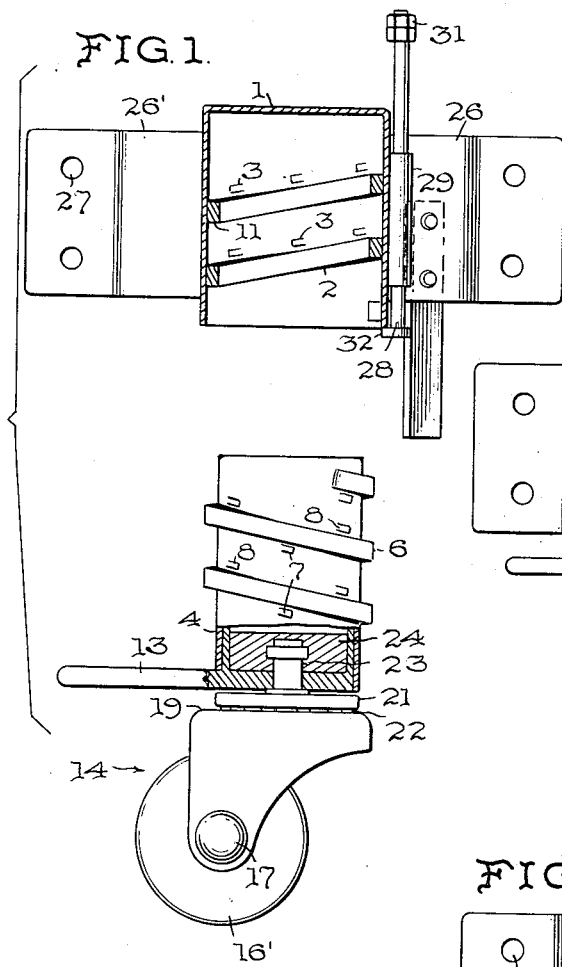
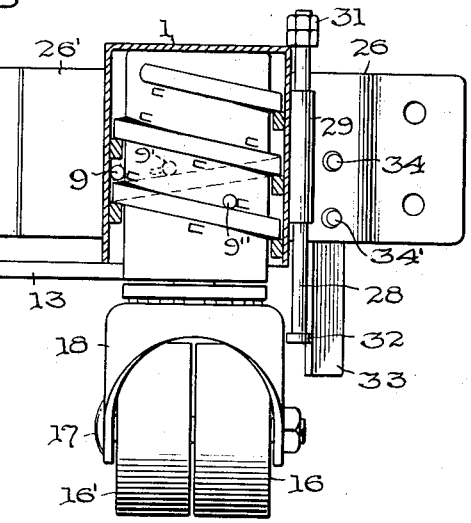
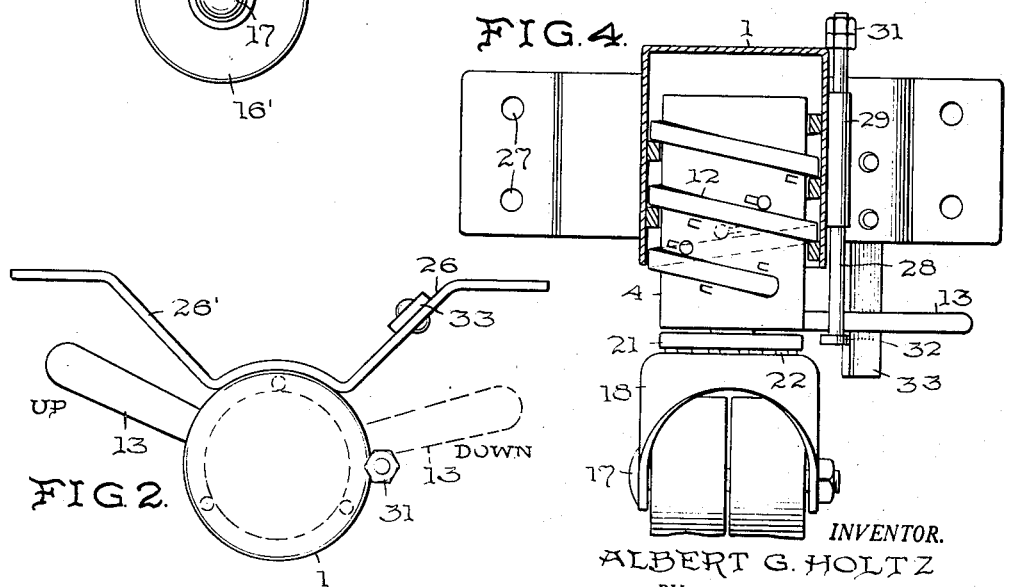
INVENTOR.
ALBERT G. HOLTZ
BY
ATTORNEYS

United States Patent Office 2,784,442
Patented Mar. 12, 1957

2,784,442

CASTER UNIT

Albert G. Holtz, Bellport, N. Y.

Application May 27, 1954, Serial No. 432,760

5 Claims. (Cl. 16—32)

This invention relates to casters and more particularly to that type of caster which may be raised or lowered relative to an article of furniture or equipment or the like to which it may be attached.

Heavy articles of furniture or machinery or the like generally are mounted upon legs or flat bases and occasionally upon casters. Mounting such heavy articles upon legs or bases provides rigidity and stability for the articles, but such a mounting impedes mobility. When such articles are mounted upon casters, they have mobility so that they may be moved readily for various purposes, such as cleaning, and then returned to their original location or they may be shifted from one location to another. However, a caster mounting does not give rigidity and stability to the article. Thus each type of mounting has advantages and disadvantages peculiar to itself.

The present invention contemplates a caster unit having the advantages of both of the above types of mountings, and yet a mounting which is free from the disadvantages of such mountings. Furthermore, the caster unit is strong and compact. The component parts thereof are readily movable and may be assembled easily, and yet the parts thereof may not be disassembled accidentally.

The caster contemplated by this invention may be attached to the legs or base of a heavy article so that the article normally rests upon its legs or base and hence is firmly and stably supported. When it is desired to shift the article from its location, the caster may be lowered relative to the legs or base of the article and then locked in its lowered position so that the article is supported by the caster. When the article is thus supported by the caster, it may be shifted readily from one location to another. The article may be restored to a stable and firm state by unlocking the caster so that the caster automatically rises relative to the article and the article once again rests on its legs or base.

In general, the caster unit comprises a caster having a helical member extending upwardly therefrom and in rotatable engagement with a second helical member attached to the legs or base of an article of furniture, equipment, or the like whereby the helical member extending upwardly from the caster may be rotated in engagement with the second helical member and thereby raise or lower the caster relative to the article of furniture.

More specifically, the caster unit comprises a cylindrical sleeve having a pair of flanges mounted on the outer surface thereof for attachment of the sleeve to the legs or base of an article of furniture or the like, and having a helical thread on its internal surface. Within the sleeve there is a supporting member, such as a cylinder, having a caster attached to the bottom end thereof and having a helical thread on its external surface in engagement with the helical thread on the sleeve, whereby the cylinder may be rotated within the sleeve and thereby raise or lower the caster attached thereto relative to the article of furniture attached to the flange on the sleeve. Three ball bearings are uniformly spaced peripherally about the vertical axis of the cylinder and sleeve and lie approximately in the same horizontal plane between the two threads. The three ball bearings are interposed between the helical threads so that the helical thread on the sleeve rides upon the upper surface of the balls and the balls in turn ride upon the helical thread on the cylinder. The weight of the article is thereby supported on the balls rather than upon the threads. The balls are maintained in their uniformly spaced position and prevented from rolling out of the raceway formed by the threads by bosses spirally positioned on the external surface of the cylinder which lie just above the thread thereon. Bosses are also spirally positioned on the external surface of the cylinder so that they lie just below the thread thereon and thereby accurately position the helical thread on the cylinder. The helical thread on the sleeve is positioned accurately by bosses spirally positioned on its internal surface lying just above the thread. The thread may rise freely upon the three balls when the cylinder is rotated within the sleeve, since there are no bosses below this thread.

At the bottom of the cylinder there is a handle extending radially outwardly therefrom for gripping to rotate the cylinder within the sleeve and thereby raise and lower the caster. The caster is locked in its lower position by a pin vertically movable within a collar attached to the sleeve. The pin prevents rotation of the handle in a reverse direction due to the weight of the article supported upon the caster. A vertical stop member is attached to one of the flanges after the caster unit is assembled to limit rotation of the handle and thereby prevent the caster unit from being accidentally disassembled and the ball bearings being lost. The arm by limiting rotation of the handle also prevents the handle from being rotated to such an extent that the end thereof will strike the article of furniture and mar the finish of the furniture.

The invention will be described in detail in connection with the accompanying drawing which illustrates a preferred embodiment of the invention.

In the drawing,

Fig. 1 is an exploded view of the caster unit showing the sleeve in cross section and the cylinder partly in cross section, Fig. 2 is a plan view of the assembled caster unit showing in full lines the position of the handle when the caster is in its raised position and, in dotted lines, the position of the handle when the caster is locked in its lowered position, Fig. 3 is an elevational view partly in section of the assembled caster unit showing the caster in its raised position, and Fig. 4 is a view similar to Fig. 3 but showing the caster in its lowered position.

The caster unit comprises a metallic cylindrical sleeve 1 having a helical thread 2, which may be formed conveniently of square wire, attached to the inner surface thereof in a suitable manner, such as by tack welding. The helical thread is located accurately within the sleeve by bosses 3 raised upon the inner surface of the sleeve to a height less than the depth of the thread and in a spiral line so that the upper surface of the thread touches the bosses when the thread is in its correct position.

Within the sleeve 1 there is a hollow metallic cylinder 4 forming a supporting member having an outside diameter slightly smaller than the inside diameter of the helical thread 2. A second helical thread 6 which also may be formed of square wire and which has the same pitch and depth pitch and depth as thread 2 is attached to the outer surface of the cylinder 4 by suitable means, such as by tack welding. The outer diameter of the

of said handle and being positioned so that said handle engages said stop member before said helical members are disengaged from one another, whereby disassembly of the caster unit is prevented.

5. A caster unit for an article comprising a sleeve for attachment to the base of the article, a first helical member attached to the inner surface of said sleeve, a second helical member in rotatable engagement with said first helical member and vertically movable relative thereto through such engagement, a supporting member lying within said second helical member and attached thereto, a caster suspended from said supporting member, said caster being vertically movable relative to said base of the article upon rotation of the supporting member, at least three roller bearings spaced peripherally about the axis of the supporting member and interposed between the bottom of the first helical member and the top of the second helical member, a plurality of bosses formed adjacent said second helical member and lying in the path of movement of said roller bearings, said roller bearings being maintained spaced peripherally about the supporting member and between said helical members by said bosses and the surfaces of said sleeve and said supporting member.

References Cited in the file of this patent

UNITED STATES PATENTS

| | | |
|---|---|---|
| 420,831 | Pullman | Feb. 4, 1890 |
| 558,720 | Brock | Apr. 21, 1896 |
| 1,367,499 | Rapson | Feb. 1, 1821 |

FOREIGN PATENTS

| | | |
|---|---|---|
| 129,830 | Germany | Apr. 18, 1902 |
| 424,014 | Italy | Aug. 1, 1947 |